Oct. 25, 1927.
J. A. DAVEY ET AL
1,646,812
APPARATUS FOR EXCAVATING TREE CAVITIES
Filed Aug. 2, 1923   2 Sheets-Sheet 2
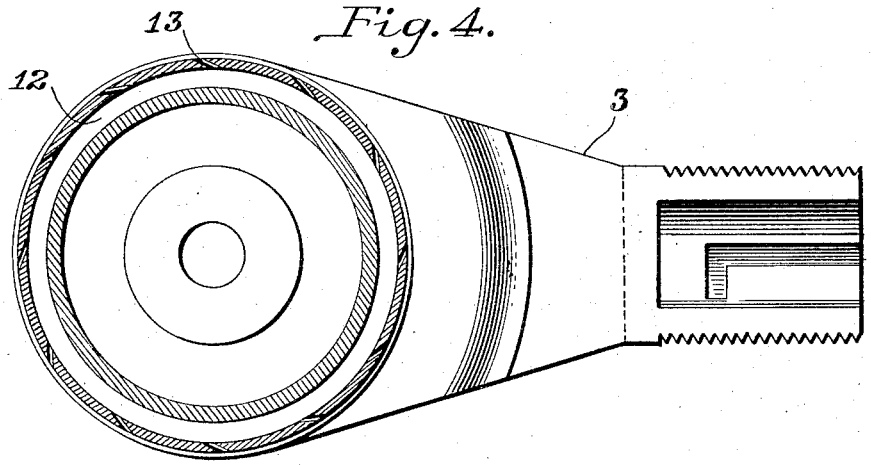
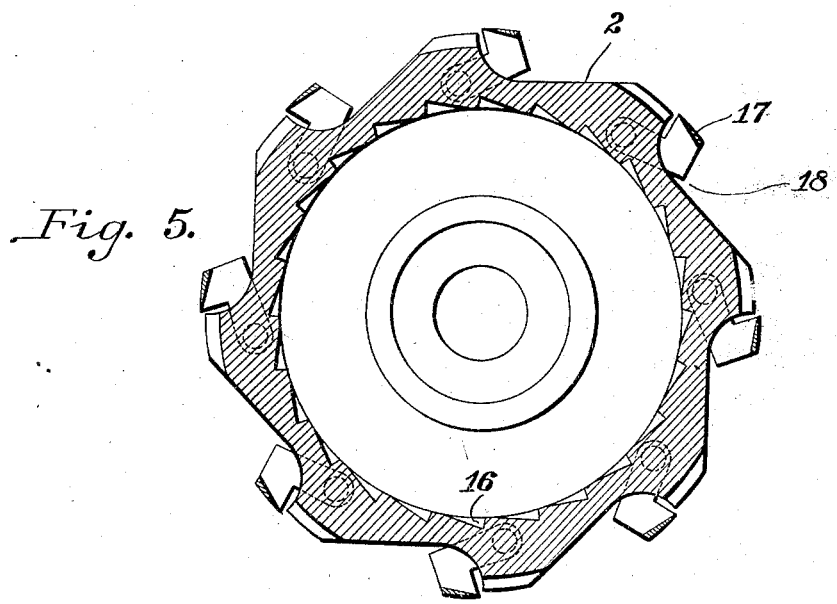
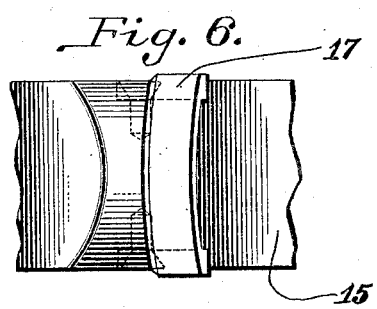
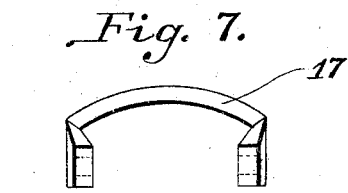

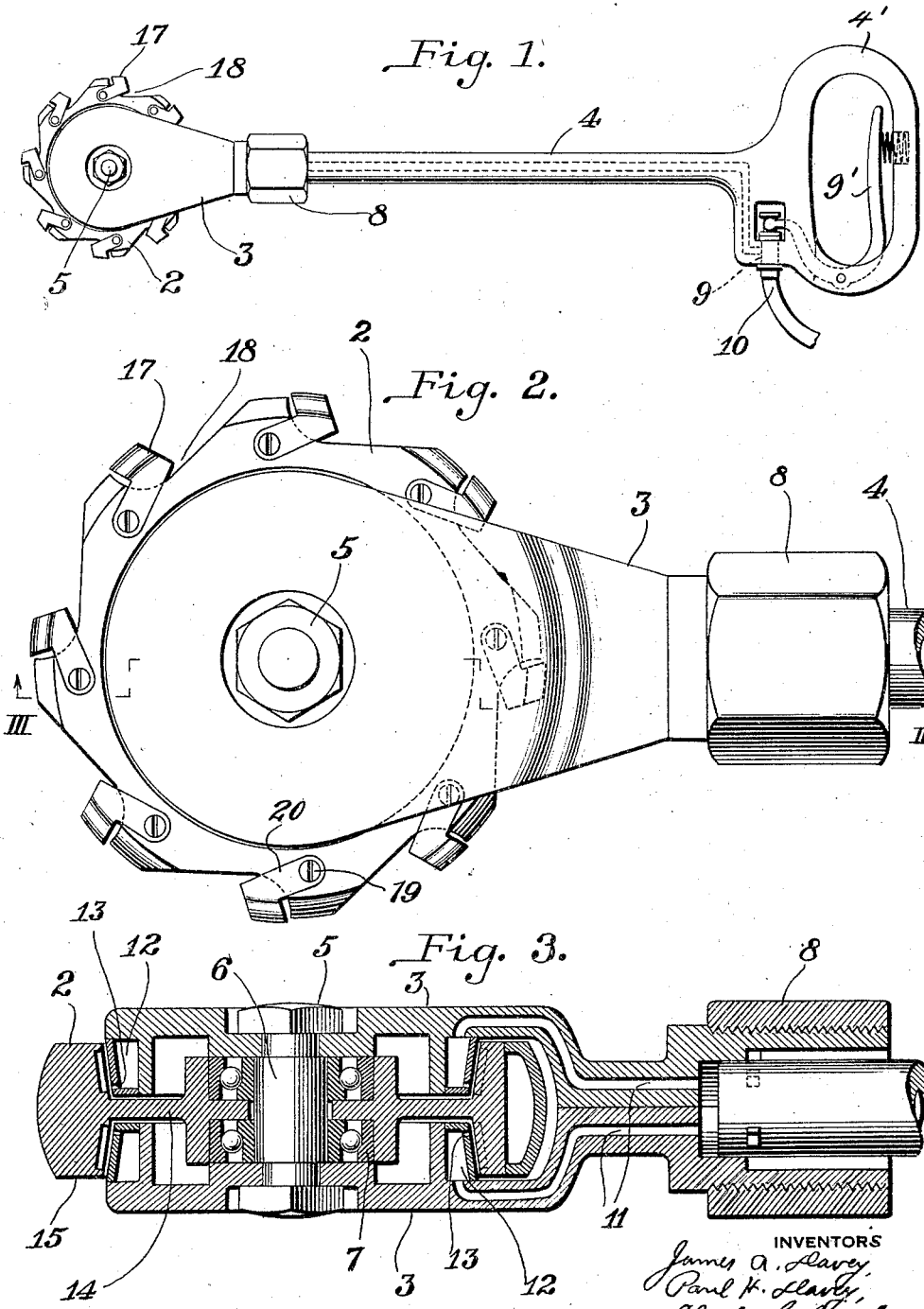

Patented Oct. 25, 1927.

1,646,812

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR OF HIS ONE-THIRD TO THE DAVEY TREE EXPERT COMPANY, OF KENT, OHIO, A CORPORATION OF OHIO.

APPARATUS FOR EXCAVATING TREE CAVITIES.

Application filed August 2, 1923. Serial No. 655,265.

Our invention relates to wood cutting tools, and is particularly applicable for excavating and cleaning tree cavities preparatory to filling them with reinforcing material.

Heretofore in excavating tree cavities, chisels or burrs have been employed. Neither of these is entirely satisfactory, since they are difficult to handle and generally result in a rough unfinished cavity.

This invention provides a fluid actuated turbine with cutting blades on the periphery thereof. These blades are preferably curved and are effective for giving a smooth finish to a tree cavity within a very short time. The cutting blades are provided with guards to limit the depth of cut, and the blades are self-clearing. As a result, both decayed and solid wood may be rapidly removed from the interior of the tree without producing any sharp corners which might be passed by in waterproofing the cavity, with the possibility of further decay.

This application is a specific embodiment of our copending application Serial No. 655264, filed Aug. 2, 1923.

In the accompanying drawings illustrating the present preferred embodiment of our invention,—

Figure 1 is a side view of a tree excavating tool embodying our invention;

Figure 2 is a drawing, to enlarged scale, of the cutting head;

Figure 3 is a section on the line III—III of Figure 2;

Figure 4 is a view, partly broken away, of one half of the cutting tool frame;

Figure 5 is a sectional view through the rotary cutting tool;

Figure 6 is a fragmentary view of the periphery of the cutting tool; and

Figure 7 is a front elevation of one of the cutting blades.

In the illustrated embodiment of our invention, a rotary cutting head 2 is carried between a pair of similar supporting members 3 at the end of a handle 4 having a grip 4'. The cutting head 2 is free to rotate, being carried by a center bolt 5, bushing 6, and ball bearings 7. The two supporting members 3 are held together by the bolt 5 and a nut 8, and together form a socket in which the handle 4 is secured by a bayonet joint, as best shown in Figure 3.

The handle 4 is hollow and is provided at its end with a spring closed valve 9 and a connection 10 for actuating fluid, preferably air. When the valve 9 is opened by the operator, by means of a spring-pressed lever 9', air passes through the handle 4 to the handle socket and through a passage 11 in each of the supporting members 3, to annular air headers 12. These headers are provided with a series of turbine nozzles 13.

The rotary cutting head 2 has a central web 14 and a wide rim 15. Turbine buckets 16 are formed on the inner faces of the rim 15, and the air headers 12 lie inside the rim 15. The nozzles 13 are placed near the web 14 so that the air as it leaves the nozzles takes an outward path. This exhaust air serves to keep dust and chips out of the working mechanism. It will be noted that the diameter of the bucket circle is greater than the diameter of the nozzle circle, this construction being particularly desirable in a tool of this character since it gives a greater torque arm and a wider range of effectiveness for the nozzles.

The rim 15 is provided with a plurality of removable cutting blades 17, straddling the rim and held by screws 19 (Fig. 2) engaged with arms 20 located considerably forward of the cutting edges of the blades in notches of the rotor, as shown in Fig. 6, so as to hold the blades securely in position and exert a pulling action thereon nearly in line with the resistance of the material being operated on. These blades are rounded, as best shown in Figure 7, in order to give a smooth finish to the cavity being worked on. The outer portion of the rim 15 is rounded to correspond to the curvature of the blades 17 and serves as a guard to limit the depth of cut. Chip spaces 18 are provided under each blade to make the tool self-clearing.

In operation, the cutting head is placed in the tree cavity and air is admitted to the tool. The cutting head rotates at very high speed and rapidly trims away the decayed matter and leaves a smooth cavity ready for waterproofing and subsequent operations. The provision of a handle of the form shown in Figure 1 enables the operator to direct the tool easily to any desired angle and materially increases its efficiency.

While we have shown the preferred embodiment of our invention, it will be understood that it is not limited to the illustrated form, but may be otherwise embodied within the scope of the following claims.

We claim:

1. A rotary tool for excavating tree cavities comprising a rotor having a convex periphery with chip spaces therein, cutting blades straddling the rotor immediately back of uninterrupted parts of the rotor over such chip spaces said blades having forwardly projecting arms in grooves of the rotor at an acute angle to the intermediate blade portion, and means for securing said arms in place.

2. A tool for excavating tree cavities, comprising a cutting head, a rotary air-driven tool therein, an elongated handle connected to the head by a quickly detachable joint, said handle having a passage for conducting air under pressure to the tool, a hand-grip on the handle, a valve in said passage, and a control lever for said valve located in the hand grip in position to open the valve when the operator's hand closes on said grip.

In testimony whereof we have hereunto set our hands.

JAMES A. DAVEY.
PAUL H. DAVEY.
CHARLES L. GAUGLER.